(12) United States Patent
Kling et al.

(10) Patent No.: US 6,367,023 B2
(45) Date of Patent: Apr. 2, 2002

(54) METHOD AND APPARATUS OF MEASURING CURRENT, VOLTAGE, OR DUTY CYCLE OF A POWER SUPPLY TO MANAGE POWER CONSUMPTION IN A COMPUTER SYSTEM

(75) Inventors: Ralph M. Kling, Sunnyvale; Edward T. Grochowski, San Jose, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/219,578

(22) Filed: Dec. 23, 1998

(51) Int. Cl.$^7$ ................................................ G06F 1/28
(52) U.S. Cl. ...................................... 713/340; 713/601
(58) Field of Search ................................ 713/300–340, 713/600–601; 714/14, 22, 47; 323/282–290

(56) References Cited

U.S. PATENT DOCUMENTS

| | | | |
|---|---|---|---|
| 3,941,989 A | * 3/1976 | McLaughlin et al. | 235/156 |
| 4,465,965 A | * 8/1984 | Chernotsky et al. | 323/239 |
| 4,471,408 A | 9/1984 | Martinez | 361/392 |
| 4,951,171 A | * 8/1990 | Tran et al. | 361/90 |
| 5,416,723 A | * 5/1995 | Zyl | 364/492 |
| 5,452,277 A | 9/1995 | Bajorek et al. | 369/54 |
| 5,475,847 A | * 12/1995 | Ikeda | 395/750 |
| 5,483,635 A | * 1/1996 | Kameyama | 395/182.12 |
| 5,483,656 A | * 1/1996 | Oprescu et al. | 713/320 |
| 5,513,361 A | * 4/1996 | Young | 395/750 |
| 5,532,935 A | * 7/1996 | Ninomiya et al. | 364/492 |
| 5,534,734 A | * 7/1996 | Pugh et al. | 307/38 |
| 5,544,138 A | 8/1996 | Bajorek et al. | 369/54 |
| 5,624,572 A | 4/1997 | Larson et al. | 210/746 |
| 5,694,029 A | * 12/1997 | Hayes et al. | 323/282 |
| 5,719,800 A | * 2/1998 | Mittal et al. | 364/707 |
| 5,740,410 A | 4/1998 | McDermott | 395/556 |
| 5,764,173 A | 6/1998 | Flynn | 341/152 |
| 5,774,083 A | 6/1998 | Flynn | 341/118 |
| 5,812,617 A | 9/1998 | Heckman et al. | 375/362 |
| 5,926,053 A | 7/1999 | McDermott et al. | 327/298 |
| 5,948,106 A | * 9/1999 | Hetherington et al. | 713/501 |
| 5,978,864 A | * 11/1999 | Hetherington et al. | 710/18 |
| 5,983,355 A | 11/1999 | Kenny et al. | 713/322 |
| 6,018,690 A | * 1/2000 | Saito et al. | 700/295 |
| 6,104,622 A | 8/2000 | Shin | 363/21 |
| 6,167,524 A | * 12/2000 | Goodnow et al. | 713/300 |
| 6,182,232 B1 | * 1/2001 | Klein | 713/340 |

FOREIGN PATENT DOCUMENTS

| | | | |
|---|---|---|---|
| EP | 0057645 | 8/1982 | H01L/23/00 |
| EP | 11038079 | 2/1999 | G01R/31/26 |
| EP | 11135938 | 5/1999 | H05K/3/34 |
| WO | WO 97/24763 | 7/1997 | H01L/23/12 |

OTHER PUBLICATIONS

PCT International Search Report for International Application No. PCT/US99/28047 mailed Mar. 7, 2000.

* cited by examiner

*Primary Examiner*—Sumati Lefkowitz
(74) *Attorney, Agent, or Firm*—David J. Kaplan

(57) ABSTRACT

A system includes a power supply, a meter coupled to the power supply, and a controller. The meter takes a measurement of a parameter that is approximately proportional to the power consumed from the power supply by at least a portion of a computer system. This parameter may include, for example, the current or voltage between the power supply and the portion of the computer system, or the duty cycle of a switching signal in the power supply. This measurement is then used by the controller to determine if the power consumed by the portion of the computer system reaches a threshold, and if so, the controller sends a throttle signal. A system and method such as this may be found useful to reduce the risk of a computer system blowing a fuse or tripping a circuit breaker.

23 Claims, 9 Drawing Sheets

METHOD AND APPARATUS OF MEASURING CURRENT, VOLTAGE, OR DUTY CYCLE OF A POWER SUPPLY TO MANAGE POWER CONSUMPTION IN A COMPUTER SYSTEM

The present invention relates to computer systems and more particularly to limiting the power consumed in a computer system by throttling the power consumed by an integrated circuit in response to a high power condition.

BACKGROUND

Computer systems, from small handheld electronic devices to medium-sized mobile and desktop systems to large servers and workstations, are becoming increasingly pervasive in our society. Computer systems typically include one or more processors. A processor manipulates and controls the flow of data in a computer by executing instructions. To provide more powerful computer systems for consumers, processor designers strive to continually increase the operating speed of the processor. Unfortunately, as processor speed increases, the power consumed by the processor tends to increase as well. Historically, the power consumed by the processor has been limited by two factors. First, as power consumption increases, the processor tends to run hotter, leading to thermal dissipation problems. Second, as power consumption increases, the battery life of mobile computer systems decreases, leading to less attractive systems for consumers.

Processor and computer system designers have developed numerous methods to deal with these issues. For example, processor designers implement specialized circuit design techniques that reduce power consumption. In addition, modern computer systems are designed to shut down portions of the system that are not needed during a particular period of time. Both of these techniques conserve power and help extend battery life.

To address the thermal issue, elaborate thermal dissipation systems are often affixed to the processor to help dissipate the heat from the processor to the ambient environment. Some processor packages include a thermal sensor to monitor the temperature of the processor. If the processor temperature exceeds a particular threshold, the processor is placed into low power mode until it cools off. If these precautions are not taken, the processor may destroy itself by its own heat.

SUMMARY OF THE INVENTION

A method and apparatus are described for managing the power consumed in a computer system. In accordance with one embodiment of the present invention, a measurement is taken of an electrical parameter that is approximately proportional to the power consumed by at least a portion of a computer system. This measurement is then used to determine if the power consumed by the portion of the computer system has reached a threshold.

Other features and advantages of the present invention will be apparent from the accompanying drawings and the detailed description that follows.

BRIEF DESCRIPTION OF THE DRAWINGS

The present invention is illustrated by way of example and not limitation in the accompanying figures in which like references indicate similar elements and in which.

DETAILED DESCRIPTION

Computer system power consumption is now rapidly approaching the point at which the power required to operate the system can no longer be reliably supplied to the system. This is primarily due to the fact that one or more processors contained in a system plugged into a power outlet may consume more power during an overactive period than the power outlet can deliver. Under this situation, the fuse or circuit breaker that protects the power outlet can be tripped (or blown) during normal operation of the system.

In accordance with an embodiment of the present invention, the power consumed by at least a portion of a computer system is monitored by measuring a parameter that is approximately proportional to the consumed power, such as voltage, current, or the duty cycle of a switching signal in a power supply. These measurements are provided to a power controller. The portion of the computer system that is monitored may include one or more processors of the computer system in addition to other integrated circuits (ICs) that consume a significant amount of power such as, for example, the bridge (or "chipset") or the video terminal.

Once the consumed power, as determined by the power controller, reaches a threshold, a throttle signal is sent to one or more ICs of the computer system by the controller. In response to receiving this throttle signal, one or more of the ICs reduces its power consumption. For example, for one embodiment of the present invention, a processor of the computer system reduces its core frequency while maintaining a consistent bus frequency in response to receiving the throttle signal. For another embodiment, the processor stalls all or a portion of one or more pipelines, or issues no-ops to one or more pipelines, in response to receiving the throttle signal.

By directly monitoring power consumption, or a value proportional thereto, temperature measurement inaccuracies related to poor positioning of thermal sensors in proximity to the processor are avoided. In addition, the response time between detecting a high power condition and reducing the power consumption of the computer system is greatly improved over the use of thermal sensors to detect the high power condition. A more detailed description of embodiments of the present invention, including various configurations and implementations, is provided below.

Figure 1:
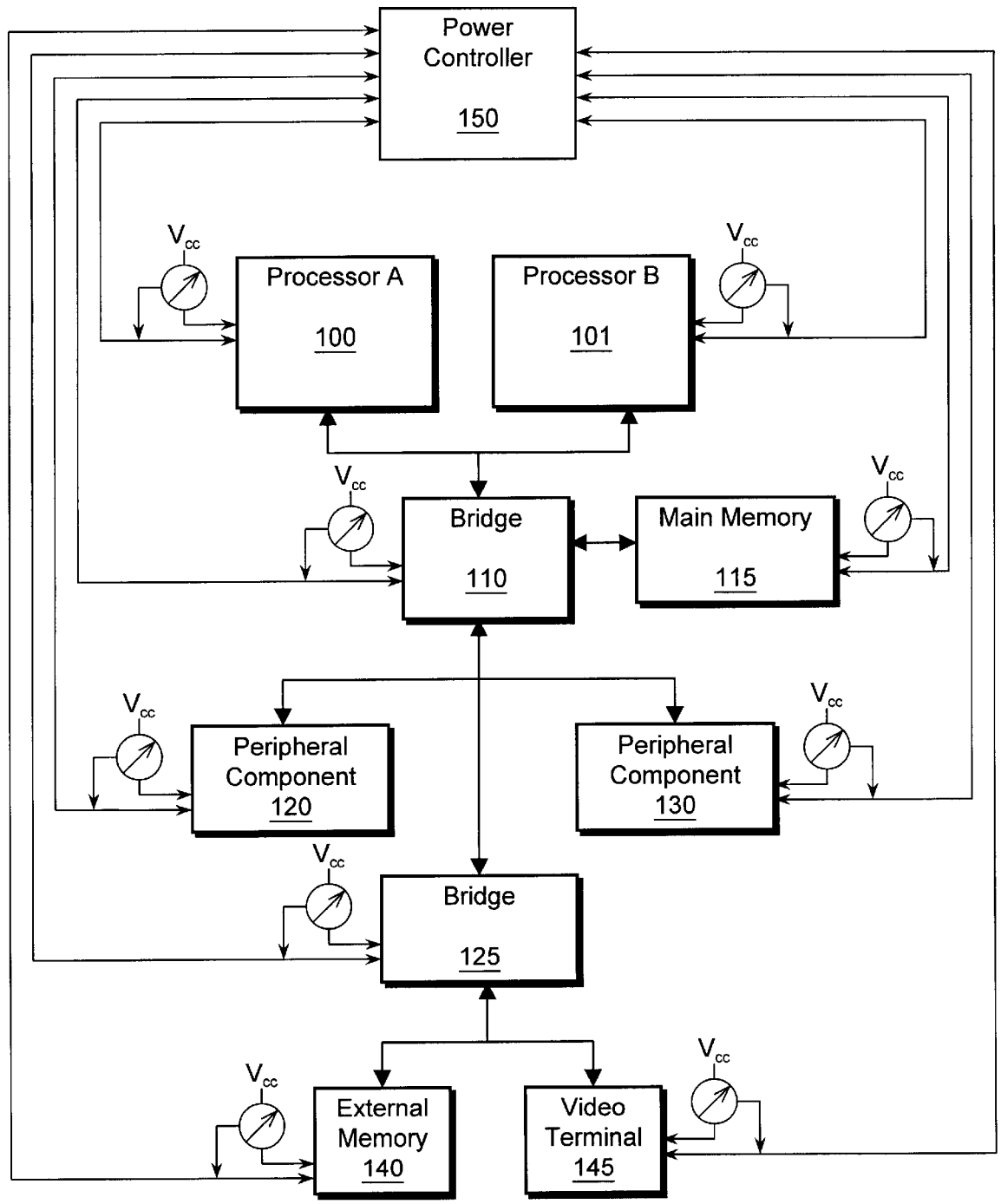
FIG. 1 is a computer system formed in accordance with an embodiment of the present invention.

FIG. 1 is a multiprocessor computer system formed in accordance with an embodiment of the present invention. Primary bridge 110 is coupled to processors 100 and 101 via a system bus. Bridge 110 is used to couple the processors to main memory 115 and to couple the processors to peripheral components 120 and 130 via a peripheral bus. Secondary bridge 125 couples external memory 140 and video terminal 145 to the peripheral bus.

Peripheral components 120 and 130 of FIG. 1 may include audio and video input/output devices such as audio/video generators, accelerators, or analyzers. External memory 140 may include a hard drive, floppy disk, tape drive, or other non-volatile, machine-readable, storage medium. Video terminal 145 may include any video display device such as a cathode ray tube (CRT) terminal or a flat panel display such as a liquid crystal display (LCD). Main memory 115 may include dynamic RAM (DRAM), static RAM (SRAM), flash EPROM, or other high speed, high capacity storage medium. For an alternate embodiment of the present invention, the computer system of FIG. 1 may be modified to be a uniprocessor system, or it may include more than two processors.

Each device of the computer system of FIG. 1 is supplied power by a power supply, $V_{cc}$, and this power is monitored by a meter. Power controller 150 is coupled to each device and to each meter. Note that each device may include one or more ICs that consume power. For one embodiment of the present invention, the computer system includes one or more independent power supplies, each of which provides power to one or more ICs. A meter may monitor the power consumed by a single IC or any number of ICs. For a simpler embodiment of the present invention, one or more meters may be coupled to only a selected number of ICs, monitoring the power consumption of those selected ICs. For this embodiment, it may be found advantageous for the monitored ICs to be those ICs that consume the majority of power in the computer system. For example, only the power consumed by processor A 100 and processor B 101, alone, or in addition to bridge 110, video terminal 145, and external memory 140 may be monitored. In addition, power controller 150 may be coupled to all or only a selected number of ICs or meters.

In accordance with one embodiment of the present invention, power controller 150 of FIG. 1 is a stand-alone IC or is a unit included within another IC. For example, for one embodiment of the present invention, power controller 150 may be included in a bridge or a processor of the computer system. For an alternate embodiment of the present invention, the power controller is software code executed by a processor of the computer system to implement the functionality described below.

One or more of the meters of the computer system of FIG. 1 monitor power consumption by measuring a parameter that is approximately proportional to the power consumed by one or more ICs. These measurements are then provided to power controller 150. For example, a meter may measure power, current, or voltage. Current consumption may be measured magnetically by, for example, hall-effect sensors that measure induction. Alternatively, the voltage drop across a resistor having a known resistance may be measured.

Figure 1A:
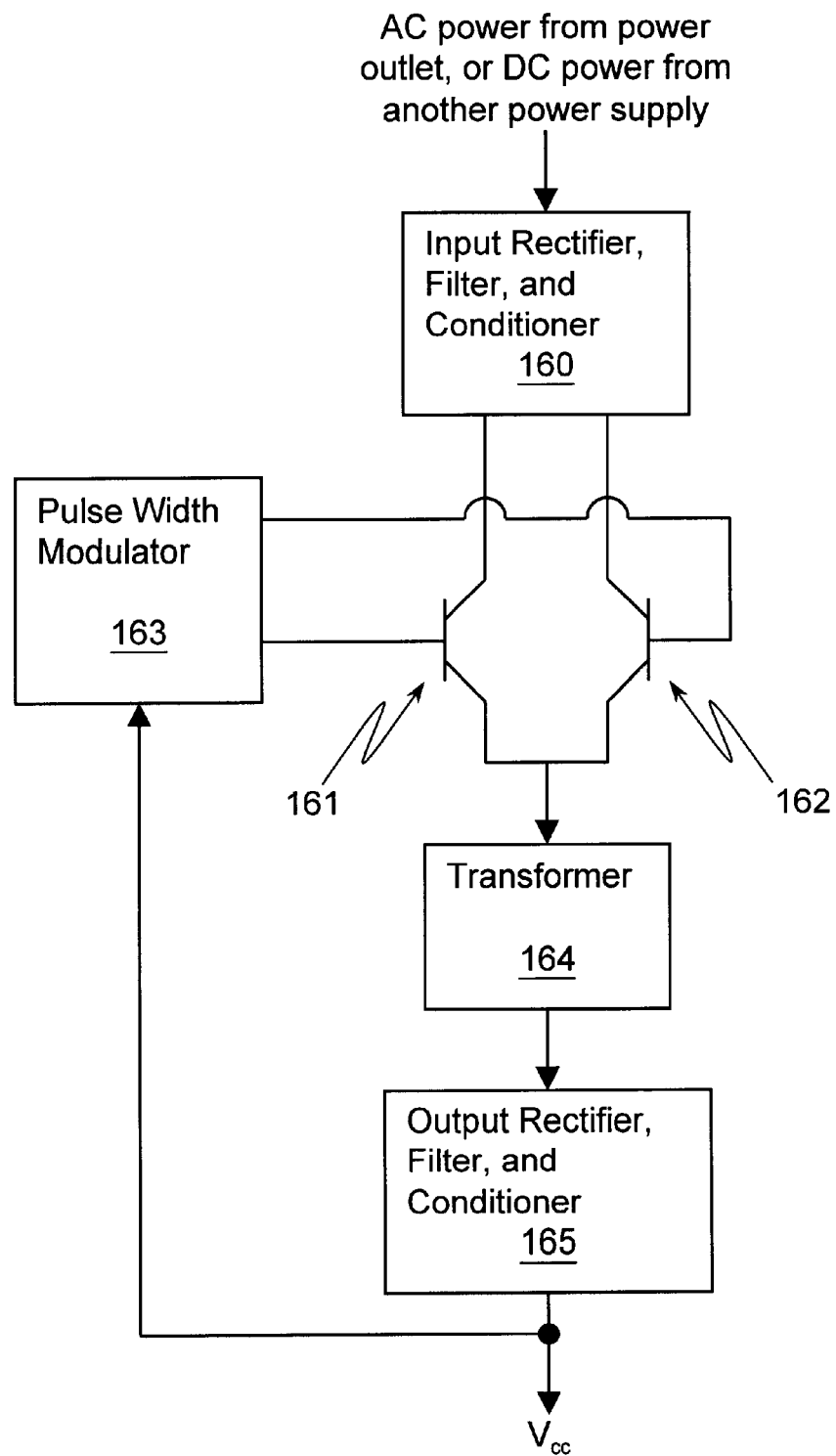
FIG. 1A is a switching regulator in a power supply of FIG. 1.

For an embodiment in which a power supply includes a switching regulator, one or more parameters of the switching signal may be measured by the associated meter of FIG. 1. FIG. 1A is a switching regulator in a power supply of FIG. 1. As shown in FIG. 1A, the AC power signal from the power outlet is rectified, filtered, and conditioned by input circuit 160. Alternatively, for an embodiment in which two or more power supplies are cascaded, the input to circuit 160 may be the DC power signal from another power supply. For this alternate embodiment, the power signal need not be rectified by input circuit 160.

The resulting high voltage DC power signal from input circuit 160 is pulse modulated by switching transistors 161 and 162 under control of pulse width modulator 163. Modulator 163 controls the power signal modulation by providing a switching signal to the bases of the transistors. The resulting, pulsed power signal is provided to transformer 164, the output of which is rectified, filtered, and conditioned by output circuit 165. The resulting DC power signal, $V_{cc}$, is provided to one or more ICs of the computer system, and is fed back to pulse width modulator 163. This feedback signal is monitored by modulator 163 to regulate the pulse width of the switching signal. If $V_{cc}$ falls below the desired output voltage, modulator 163 increases the pulse width. If $V_{cc}$ rises above the desired output voltage, the modulator decreases the pulse width.

One or more parameters of the switching signal provided from modulator 163 to the bases of switching transistors 161 or 162 may be proportional to the power or current consumed by the ICs coupled to the $V_{cc}$ output. For example, the pulse width or duty cycle (both of which are referred to herein as the duty cycle) may be proportional to the power consumption. Therefore, in accordance with one embodiment of the present invention, the duty cycle of the switching signal is measured by the associated meter of FIG. 1, and these measurements are provided to power controller 150. The duty cycle may be measured from the switching signal provided to one or both bases of the switching transistors. Alternatively, pulse width modulator 163 may provide a separate signal that indicates the duty cycle of the switching signal. For another embodiment, the duty cycle of the switching signal is indirectly measured by measuring the duty cycle of the pulsed power signal provided from the switching transistors to transformer 164.

Referring again to FIG. 1, the measurements from the meters may be converted into digital format for processing by power controller 150. Alternatively, if power controller 150 includes analog circuitry, the measurements may remain as analog current or voltage levels.

Power controller 150 gathers the measurements from one or more of the meters of the computer system of FIG. 1 and calculates the total power consumed by the portion of the computer system comprising the associated ICs. Alternatively, power controller 150 may calculate a total of any value, such as current, voltage, or duty cycle, that is proportional to the total power consumed by the portion of the computer system. If the total power consumed reaches a threshold, or if the total of a value that is proportional to the total power consumed reaches a threshold, controller 150 sends a throttle signal to one or more ICs of the computer system. In response to receiving a throttle signal, an IC reduces its power consumption. Note that for simplicity, as used henceforth, the term "power" includes either actual power or a value, such as current, voltage, duty cycle, or other measurement, that is proportional to power.

The ICs that receive the throttle signal and, in turn, reduce their power consumption, may be selected by power controller 150 of FIG. 1 in any of a number of different ways. For one embodiment of the present invention, power controller 150 sends a throttle signal to the one or more ICs that consume the majority of power in the computer system. For example, for this embodiment the throttle signal may be sent to one or both of processors 100 or 101. For another embodiment, power controller 150 sends a throttle signal to the one or more ICs having a low impact on the operation of the computer system. For example, for this embodiment the throttle signal may be sent to video terminal 145 or external memory 140. As another example of this embodiment, the throttle signal may be sent to one or both of peripheral components 120 or 130 if these devices are either inactive or not necessary to the near term execution of instructions in processors 100 or 101.

Figure 2A:
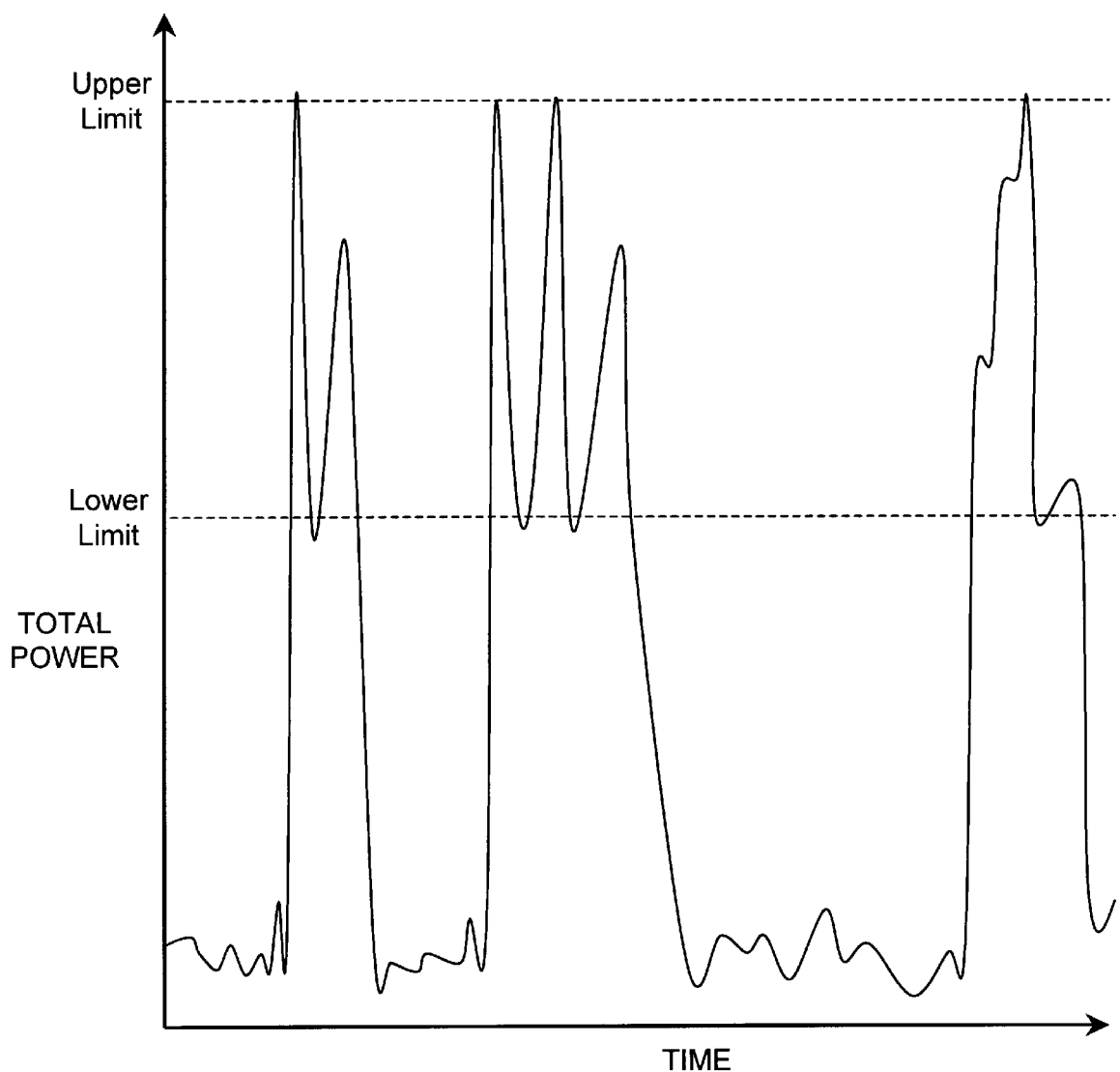
FIG. 2A is a graph showing total power consumption versus time for an embodiment of the present invention.

FIG. 2A is a graph showing the total power consumption versus time for all or a portion of the computer system of FIG. 1 in accordance with one embodiment of the present invention. The upward spikes in the graph are indicative of periods of overactivity by one or more ICs of the computer system, typically the processors. The upper threshold set in the power controller is shown as the upper limit line in the graph of FIG. 2A. This threshold may be permanently set within the power controller or may be modifiable by the system designer or system user via software or hardware control.

For one embodiment of the present invention, the upper limit is a constant value as shown in FIG. 2A. This constant value may be associated with an approximately maximum power that can be reliably consumed by the computer system from a power outlet into which the system is plugged before the outlet's fuse or circuit breaker trips. This value may be changed by, for example, modifying the settings stored in the basic input/output system (BIOS) of the computer. For another embodiment of the present invention, the threshold is not strictly a function of total power consumed but rather a function of both total power consumed and time. For example, some power outlets are able to sustain high power conditions for limited periods of time before their circuit breaker trips. In these cases, the total power value may be integrated over a period of time and compared to a threshold value associated with the total power delivery specifications of the outlet. For this example, power spikes may be tolerated for limited periods of time.

Once the threshold is reached, the power controller sends a throttle signal to one or more ICs of the computer system. When an IC reduces its power consumption in response to the throttle signal, the total power consumption, as calculated by the power controller, is reduced as shown in FIG. 2A.

For the embodiment of FIG. 2A, once triggered, the throttle signal is continually asserted until the total power consumption, as calculated by the power controller, reaches the lower threshold indicated by the lower limit line. Once this lower threshold is reached, the throttle signal may be deasserted, and, in response, the IC resumes normal operation. In accordance with this embodiment, the lower threshold may be set to a predetermined value selected to provide hysteresis to reduce the occurrence of power oscillation between the upper and lower thresholds. This lower threshold may be hard wired into the power controller or hard wired into the IC that receives the throttle signal. Alternatively, the lower threshold may be modifiable by a user or automatically adjusted within the computer system to, for example, reduce power oscillation.

Figure 2B:
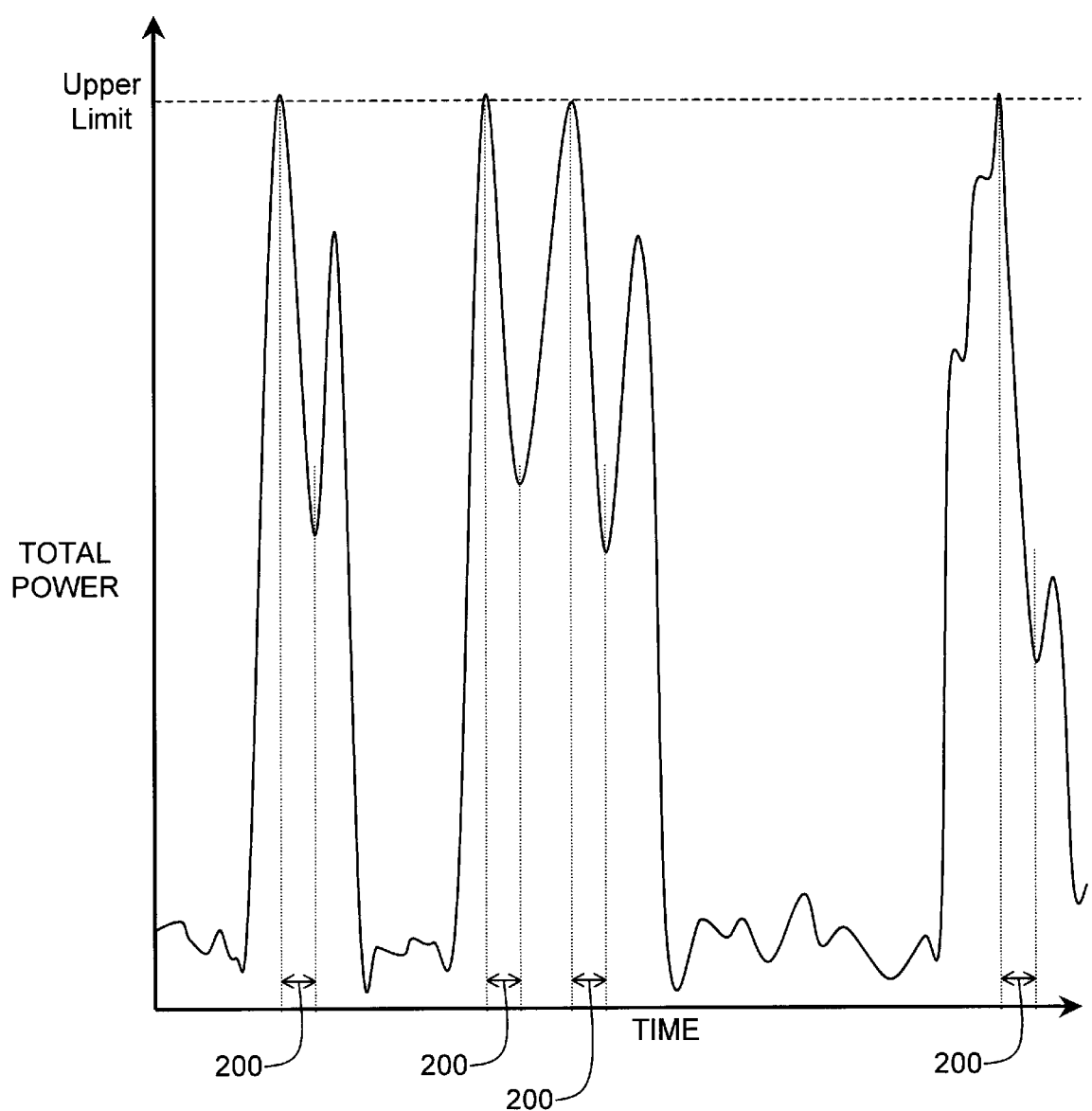
FIG. 2B is a graph showing total power consumption versus time for an alternate embodiment of the present invention.

FIG. 2B is a graph showing the total power consumption versus time for all or a portion of the computer system of FIG. 1 in accordance with an alternate embodiment of the present invention. The graph of FIG. 2B is similar to the graph of FIG. 2A except that for the embodiment of FIG. 2B, once the throttle signal is triggered, the signal is continually asserted for a predetermined period of time, 200. Once this predetermined period of time, 200, has passed, the throttle signal may be deasserted, and, in response, the IC resumes normal operation. In accordance with this embodiment, the predetermined period of time may be selected to reduce the occurrence of total power consumption oscillation. This predetermined period of time, 200, may be hard wired into the power controller or hard wired into the IC that receives the throttle signal. Alternatively, predetermined period of time, 200, may be modifiable by a user or automatically adjusted within the computer system to, for example, reduce power oscillation.

Figure 3:
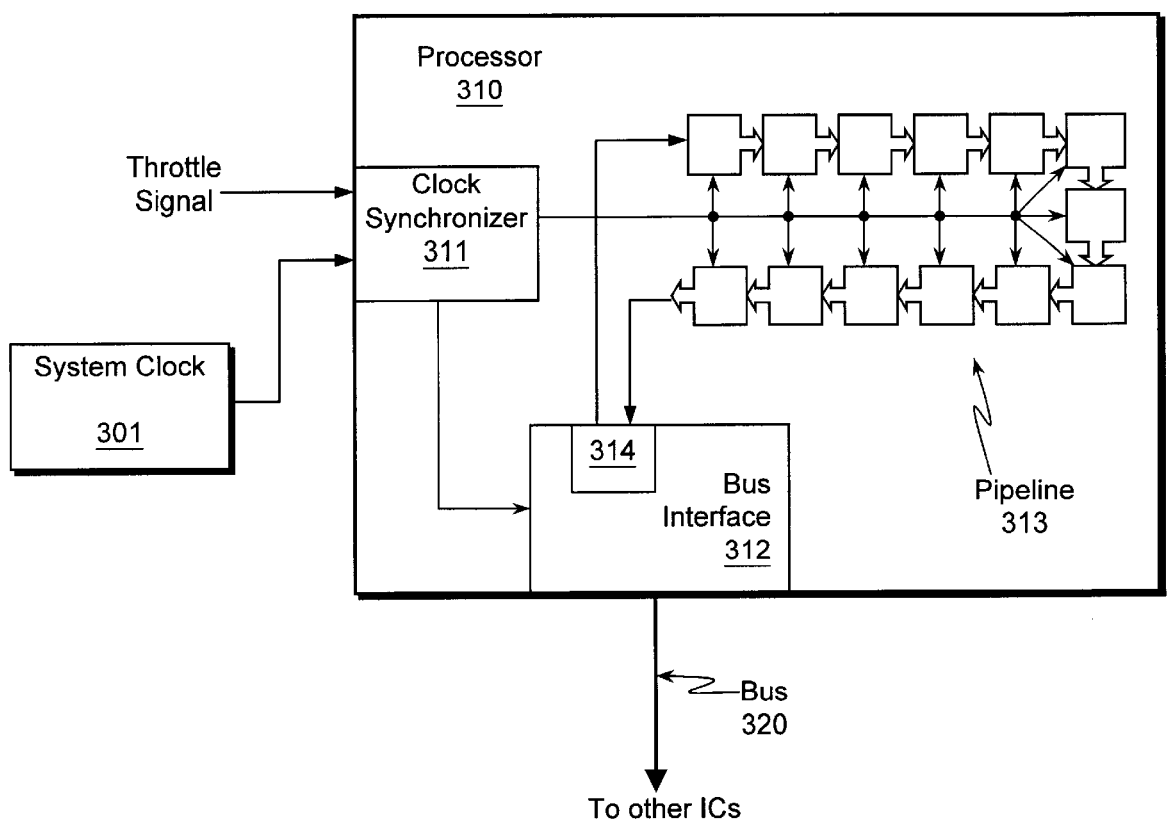
FIG. 3 is a computer system including a processor formed in accordance with an embodiment of the present invention.

FIG. 3 is a computer system including processor 310 formed in accordance with an embodiment of the present invention. System clock 301 and a throttle signal line are coupled to clock synchronizer 311 of processor 310. Processor 310 includes bus interface 312 and a core having pipeline 313. Bus interface 312 and pipeline 313 receive separate clock signals from clock synchronizer 311. Synchronization unit 314 of bus interface 312 is coupled to the input and output of pipeline 313 and communicates data with other ICs via system bus 320.

In accordance with one embodiment of the present invention, clock synchronizer 311 of FIG. 3 receives system clock 301 and multiplies the system clock frequency by a first ratio to generate a bus frequency provided to bus interface 312. Other ICs (not shown) coupled to bus 320 communicate with processor 310 at this bus frequency. Clock synchronizer 311 also multiplies the system clock frequency by a second ratio to generate a much higher frequency called a core frequency. The core frequency is provided to pipeline 313. Pipeline 313 operates at this core frequency. Synchronization unit 314 includes synchronization logic to communicate data with pipeline 313 at the core frequency and with bus interface 312 at the bus frequency.

When a throttle signal is received by clock synchronizer 311 of FIG. 3, the core frequency is reduced by multiplying the system clock frequency by a third ratio to generate a reduced core frequency that is slower than the original core frequency. This reduced core frequency is provided to pipeline 313 which then operates at this reduced core frequency. When the throttle signal is deasserted, the core frequency is increased to its original value by multiplying the system clock frequency by the second ratio and applying the resulting high core frequency to pipeline 313. During this core frequency manipulation, the bus frequency provided to bus interface 312 remains consistent. Thus, although the operating frequency (core frequency) of processor 310 is adjusted in response to the throttle signal, the computer system continues to operate undisturbed because processor 310 communicates with the other ICs coupled to bus 320 at a consistent bus frequency.

Reducing the core operating frequency of processor 310 of FIG. 3 reduces the power consumed by processor 310. In accordance with one embodiment of the present invention, an abrupt transition between core frequencies of processor 310 may be achieved by rapidly switching between two multiplication ratios within clock synchronizer 311 in response to the throttle signal. A slower, smoother transition between core frequencies may be achieved by stepping through various multiplication ratios between the high and low core frequencies. A rapid frequency transition may be desirable to provide good reaction time to the detection of a high power state by the power controller. A slower frequency transition may be desirable to help reduce power supply transients. In accordance with one embodiment of the present invention, the speed of the frequency transition may be selected to reduce the occurrence of total power consumption oscillation. The frequency transition speed may be hard wired into the processor, modifiable by a user, or automatically adjusted within the computer system to, for example, reduce power oscillation.

For an alternate embodiment of the present invention, in response to the assertion of a throttle signal, processor 310 of FIG. 3 stalls all or a portion of pipeline 313. Stalling (also called freezing or halting) a pipeline significantly reduces the power consumption of the processor because no or few instructions are executed while the processor is stalled. Alternatively, the clock supplied to the stalled pipeline, or pipeline portion, is turned off. The pipeline stall is released upon deassertion of the throttle signal. The stall may be global, in which all pipelines within processor 310 are stalled, or local, in which only select pipelines are stalled. For an embodiment in which a local stall is implemented, which pipeline, or which portion of the pipeline, is stalled may be predetermined by the processor designer and hard wired into the processor. Alternatively, this determination may be modifiable by a user or automatically selected by the processor.

For another embodiment of the present invention, in response to the assertion of a throttle signal, processor 310 of FIG. 3 issues no-ops to pipeline 313. A no-op requires little or no servicing or activity by the processor upon execution, so the processor requires only a fraction of the power (e.g. less than half) to execute the no-op than it requires to execute most other instructions. Alternatively, the clock supplied to the pipeline, or pipeline portion, that is executing the no-op is turned off. The normal instructions of the program code are again issued to the pipeline upon deassertion of the throttle signal. For one embodiment of the present invention, a mix of both no-ops and normal instructions are issued to the pipeline during assertion of the throttle signal. The relative mix between no-ops and instructions may be predetermined by the processor designer and hard wired into the processor. Alternatively, this determination may be modifiable by a user or automatically selected by the processor.

Figure 4:
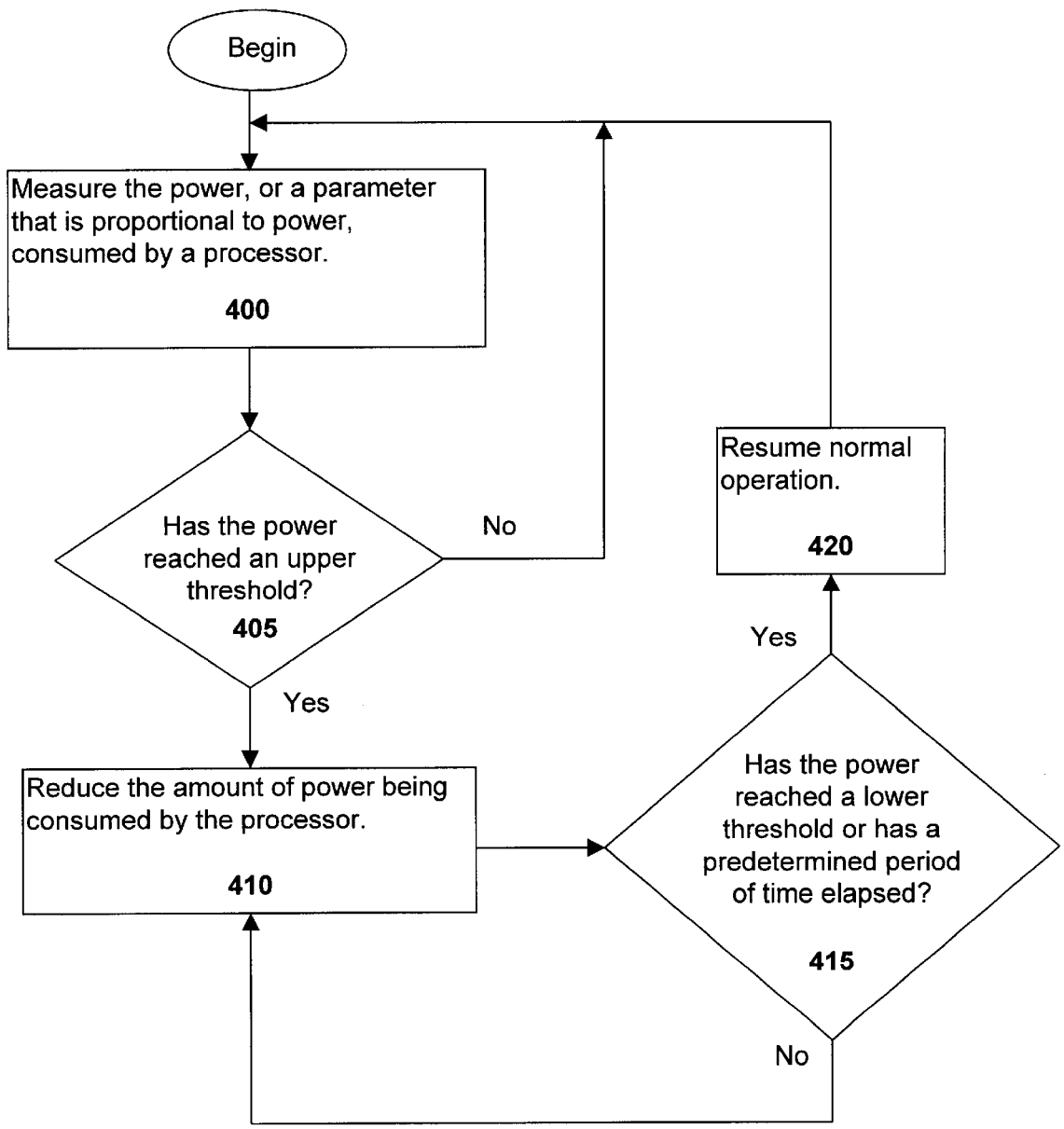
FIG. 4 is a flow chart showing a method of reducing power consumption of a processor in accordance with an embodiment of the present invention.

FIG. 4 is a flow chart showing a method of reducing power consumption of a processor in accordance with an embodiment of the present invention. At step 400, the power, or a parameter that is proportional to power, consumed by the processor is measured. This power may be measured by a meter and the value provided in either digital or analog form to a power controller. For example, an ammeter may provide a measurement of the current consumed by the processor to the power controller. Next, at step 405, the power controller determines if the power has reached an upper threshold. If the power has not reached the threshold, normal operation continues at step 400. If, however, the power has reached the threshold, then, at step 410, the amount of power being consumed by the processor is reduced. This reduction may be in response to a throttle signal sent from the power controller to the processor.

Next, at step 415 of FIG. 4, the power controller determines if the power has reached a lower threshold. For another embodiment of the present invention, the power controller alternatively or additionally determines if a predetermined period of time has elapsed since reducing the power consumption at step 410. If the determination proves to be false, then the power consumption continues to be reduced (or continues in a reduced state, for an alternate embodiment), at step 410 until the determination at step 415 holds true. Once the power has reached a lower threshold or the predetermined period of time has elapsed, normal operation is resumed at step 420 and the method proceeds back to step 400.

Figure 5:
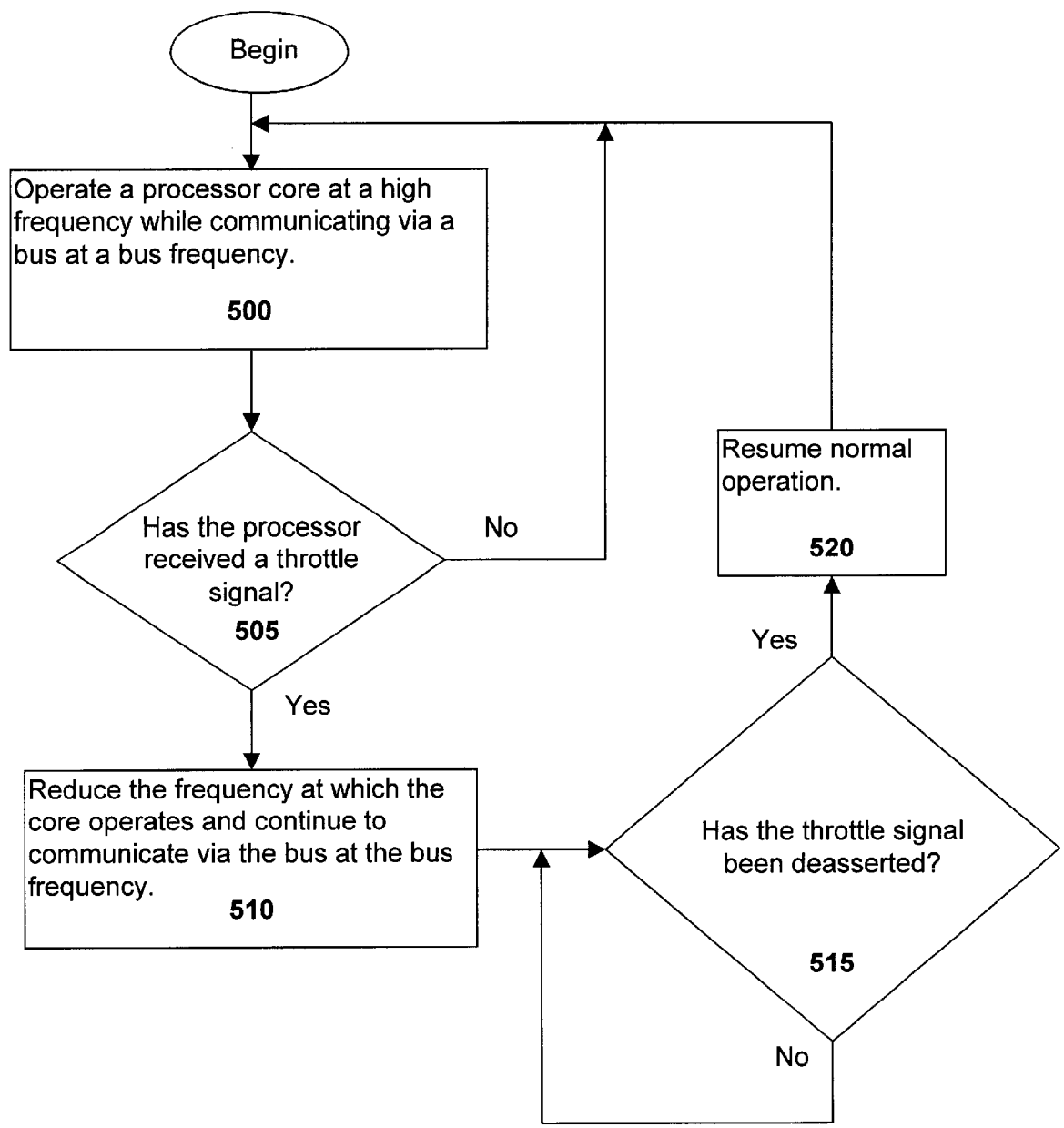
FIG. 5 is a flow chart showing the method of FIG. 4 in a first embodiment of the present invention.

FIG. 5 is a flow chart showing the method of FIG. 4 in a first embodiment of the present invention. At step 500, a processor core is operated at a high core frequency while the processor communicates with other ICs of the computer system via a bus operating at a bus frequency. Next, at step 505, it is determined if the processor has received a throttle signal. This throttle signal may be sent to the processor by a power controller upon determining that the total power consumed by all or a portion of the computer system has reached a threshold. If the processor does not receive the throttle signal (or receives a deasserted throttle signal), normal operation of the processor at the high core frequency continues. If, however, the processor receives the throttle signal, then, at step 510, the core frequency of the processor is reduced. The bus continues to communicate with the other ICs of the computer system via the bus operating at the original bus frequency.

Next, at step 515 of FIG. 5, it is determined if the throttle signal to the processor has been deasserted. The frequency is maintained at the reduced state at step 510 until the throttle signal is deasserted. Once the throttle signal is deasserted at step 515, the processor resumes normal operation at the high core frequency at step 520, and the method proceeds back to step 500.

Figure 6:
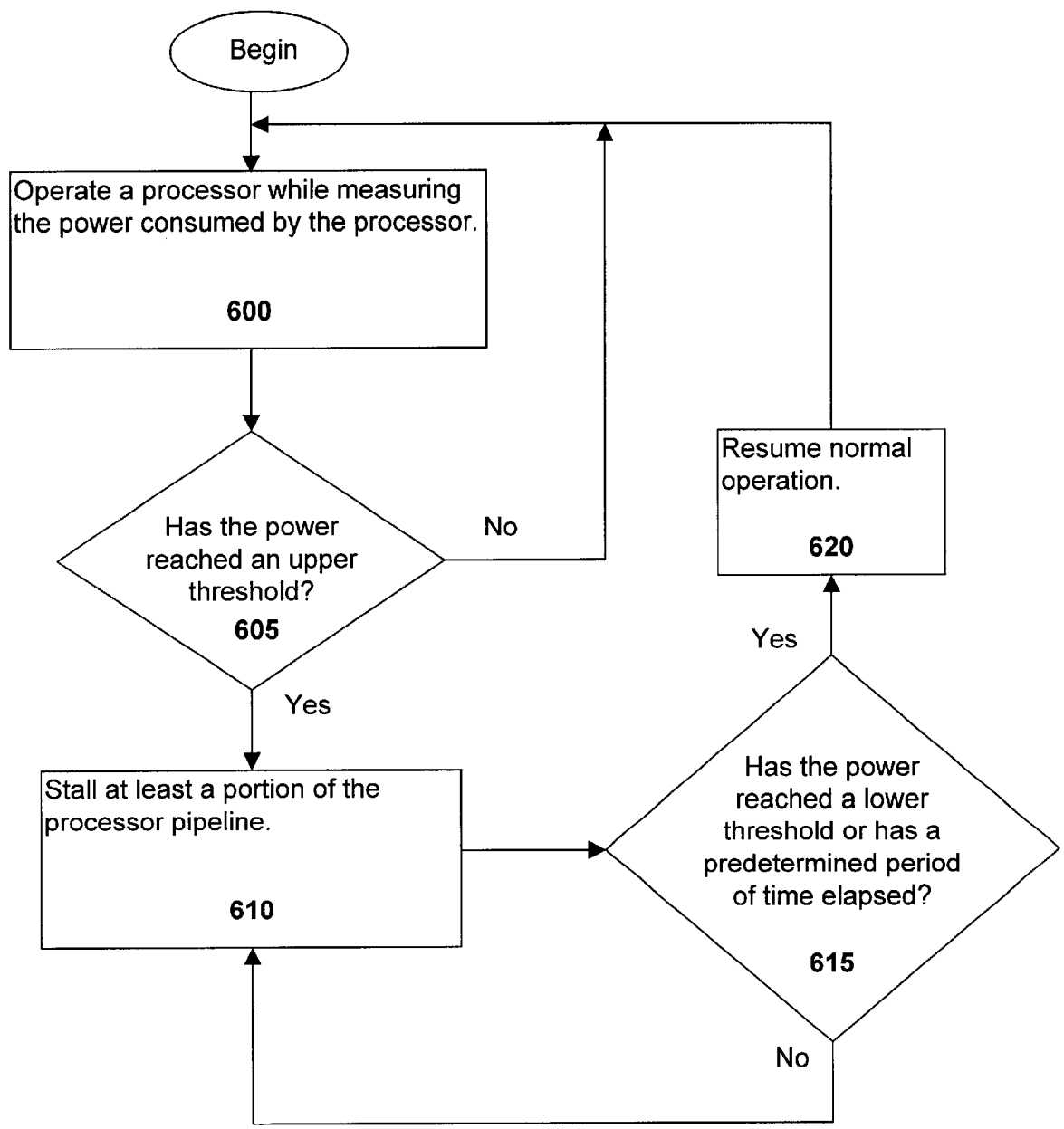
FIG. 6 is a flow chart showing the method of FIG. 4 in a second embodiment of the present invention.

FIG. 6 is a flow chart showing the method of FIG. 4 in a second embodiment of the present invention. At step 600, a processor is operated by continually issuing instructions and executing those instructions via the processor pipeline. The power consumed by the processor is continually measured during this operation and monitored by a power controller. Next, at step 605, the power controller determines if the power has reached an upper threshold. If the power has not reached the upper threshold, normal operation of the processor continues. If, however, the power has reached the upper threshold, then, at step 610, all or a portion of the processor pipeline is stalled to reduce the power consumption of the processor.

Next, at step 615 of FIG. 6, the power controller determines if the power has reached a lower threshold, or, alternatively, the power controller may determine if a predetermined period of time has elapsed since stalling the pipeline at step 610. The pipeline continues to be stalled at step 610 until the power has reached a lower threshold or the predetermined period of time has elapsed. Once the lower threshold is reached or the predetermined period of time has elapsed, normal operation is resumed at step 620 (e.g., the stall of the pipeline is released) and the method proceeds back to step 600.

Figure 7:
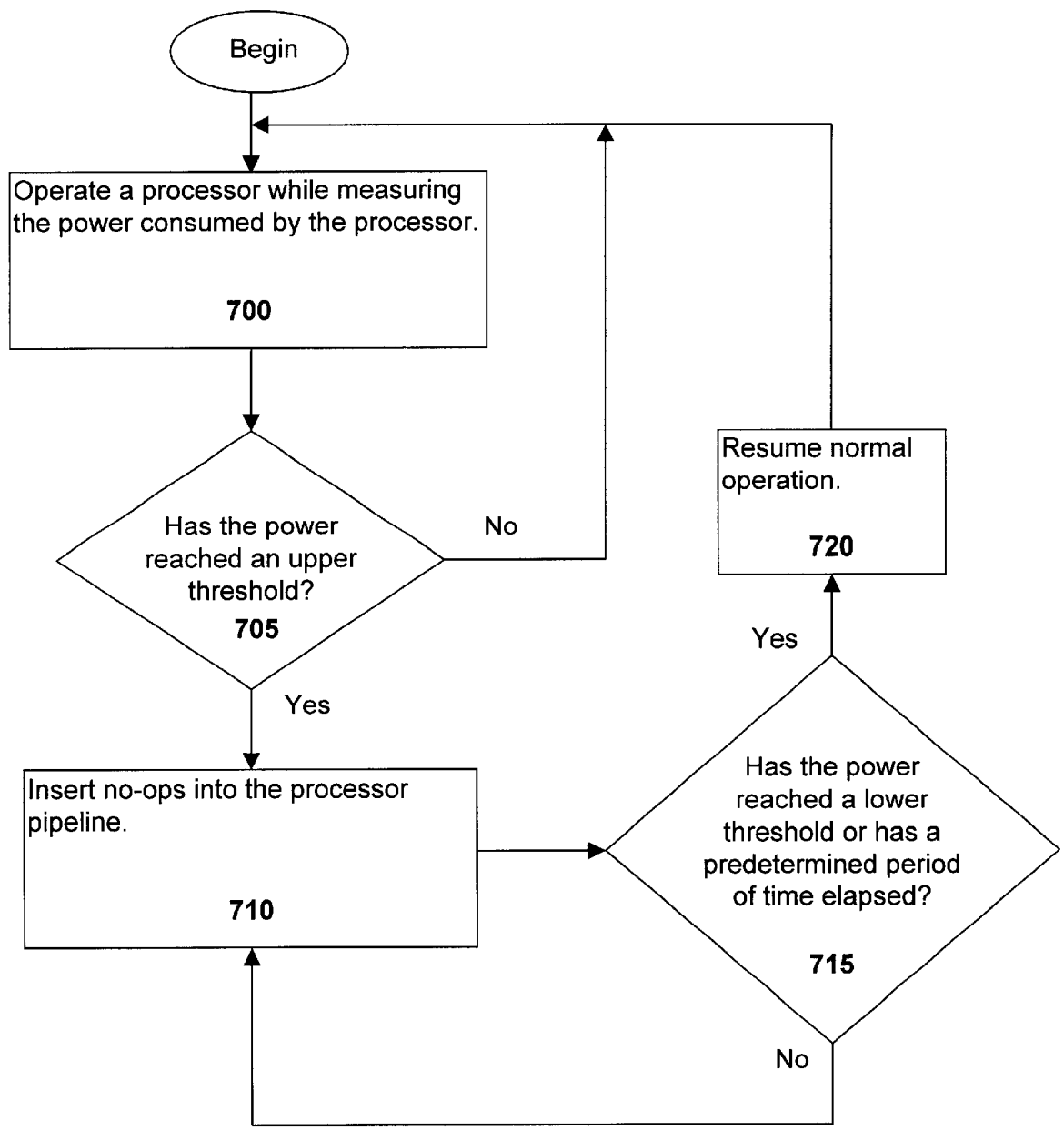
FIG. 7 is a flow chart showing the method of FIG. 4 in a third embodiment of the present invention.

FIG. 7 is a flow chart showing the method of FIG. 4 in a third embodiment of the present invention. At step 700, a processor is operated by continually issuing instructions and executing those instructions via the processor pipeline. The power consumed by the processor is continually measured during this operation and monitored by a power controller. Next, at step 705, the power controller determines if the power has reached an upper threshold. If the power has not reached the upper threshold, normal operation of the processor continues. If, however, the power has reached the threshold, then, at step 710, no-ops are inserted into the processor pipeline to reduce the power consumption of the processor.

Next, at step 715 of FIG. 7, the power controller determines if the power has reached a lower threshold, or, alternatively, the power controller may determine if a predetermined period of time has elapsed since inserting no-ops into the pipeline at step 710. No-ops continue to be inserted into the pipeline at step 710 until the power has reached a lower threshold or the predetermined period of time has elapsed. Once the lower threshold is reached or the predetermined period of time has elapsed, normal operation is resumed at step 720 (e.g., the normal instruction flow is again issued into the pipeline) and the method proceeds back to step 700.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A method of managing power consumption in a computer system comprising:

taking a measurement of a parameter that is approximately proportional to power consumed by at least a portion of the computer system; and using the measurement to determine if the power consumed by the portion of the computer system has reached a threshold associated with a power delivery specification of a power outlet into which the computer system is plugged.

2. The method of claim 1, further comprising sending a throttle signal if the power consumed by the portion of the computer system has reached a threshold.

3. The method of claim 2, further comprising reducing the power consumed by the portion of the computer system in response to an integrated circuit (IC) receiving the throttle signal.

4. The method of claim 3, wherein reducing the power consumed by the portion of the computer system includes reducing a clock frequency or voltage supplied to the IC.

5. The method of claim 3, wherein taking the measurement includes measuring a duty cycle of a switching signal in a power supply coupled to a processor, and reducing the power includes reducing power consumed by the processor in response to the processor receiving the throttle signal.

6. The method of claim 3, wherein taking the measurement includes measuring a duty cycle of a switching signal in a power supply that supplies the power, and reducing the power includes reducing power consumed by the IC in response to the throttle signal, the IC being determined to have a lower impact on operation of the computer system than an alternate IC.

7. The method of claim 1, wherein taking the measurement includes measuring a duty cycle of a switching signal in a power supply coupled to the portion of the computer system.

8. The method of claim 1, wherein taking the measurement includes measuring a duty cycle of a switching signal in a power supply that supplies the power.

9. The method of claim 1, wherein using the measurement includes determining if the power consumed by the portion of the computer system has reached the threshold, the threshold being predetermined to be a constant value.

10. The method of claim 1 wherein using the measurement includes determining if the power consumed by the portion of the computer system has reached the threshold, the threshold being calculated as a function of time.

11. A method of limiting power consumed by a computer system comprising:

measuring a first parameter that is proportional to power consumed by a first portion of the computer system;

measuring a second parameter that is proportional to power consumed by a second portion of the computer system;

sending a throttle signal to an integrated circuit (IC) of the computer system if a calculation that combines at least the first and second parameters reaches a threshold associated with a power delivery specification of a power outlet into which the computer system is plugged; and reducing power consumed by the IC in response to receiving the signal.

12. The method of claim 11, further comprising determining if the calculation reaches a threshold that is predetermined to be a user-defined value associated with the power delivery specification of the outlet into which the computer system is plugged.

13. The method of claim 11, further comprising determining if the calculation reaches the threshold, the threshold calculated as a function of time.

14. The method of claim 11, wherein the computer system is a multiprocessor computer system in which the first portion includes a first processor and the second portion includes a second processor.

15. The method of claim 11, wherein measuring the first parameter includes measuring a duty cycle of a switching signal of a first power supply coupled to the first portion of the computer system, and measuring the second parameter includes measuring a duty cycle of a switching signal of a second power supply coupled to the second portion of the computer system.

16. A computer system comprising:

a power supply to supply power consumed by at least a portion of the computer system;

a meter to measure a value of a parameter that is approximately proportional to the power; and a controller to send a throttle signal to an integrated circuit (IC) of the computer system if an amount calculated using the value reaches a threshold associated with a power delivery specification of a power outlet into which the computer system is plugged.

17. The computer system of claim 16, wherein the IC is a processor.

18. The computer system of claim 16, wherein the parameter includes a duty cycle of a switching signal of the power supply.

19. The computer system of claim 16, wherein the controller is contained within a bridge of the computer system.

20. The computer system of claim 16, wherein the threshold is predetermined to be a value associated with an approximate upper power level that can be reliably consumed by the computer system from the outlet.

21. The computer system of claim 16, wherein the threshold is a function of time.

22. The computer system of claim 16, wherein the parameter includes a current from the power supply to the portion of the computer system.

23. The computer system of claim 16, wherein the parameter includes a voltage across a resistor between the power supply and the portion of the computer system.

* * * * *